(12) United States Patent
Huang

(10) Patent No.: US 9,317,019 B2
(45) Date of Patent: Apr. 19, 2016

(54) SINUSOIDAL MODULATION CONTROL METHODS AND CIRCUITS FOR PERMANENT MAGNET SYNCHRONOUS MOTORS

(71) Applicant: Silergy Semiconductor Technology (Hangzhou) LTD, Hangzhou, ZheJiang Province (CN)

(72) Inventor: Xiaodong Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 421 days.

(21) Appl. No.: 13/775,434

(22) Filed: Feb. 25, 2013

(65) Prior Publication Data

US 2013/0241461 A1    Sep. 19, 2013

(30) Foreign Application Priority Data

Mar. 19, 2012  (CN) .......................... 2012 1 0072854

(51) Int. Cl.

| G05B 11/36 | (2006.01) |
|---|---|
| H02K 29/08 | (2006.01) |
| G05B 11/42 | (2006.01) |
| G05B 11/30 | (2006.01) |
| H02P 25/02 | (2006.01) |

(52) U.S. Cl.
CPC ................ *G05B 11/42* (2013.01); *G05B 11/30* (2013.01); *H02P 25/023* (2013.01)

(58) Field of Classification Search
CPC ....... G05B 11/42; G05B 11/30; H02P 25/023
USPC ............. 318/621, 609, 560, 400.38; 219/497; 327/518–603; 700/1–89
See application file for complete search history.

(56) References Cited

U.S. PATENT DOCUMENTS

| 3,493,844 | A  * | 2/1970 | Cole et al. ..................... 323/351 |
|---|---|---|---|
| 6,819,077 | B1 * | 11/2004 | Seibel et al. .................. 318/801 |
| 7,375,934 | B2 * | 5/2008 | Wang et al. ..................... 361/23 |
| 7,714,529 | B2 * | 5/2010 | Chen ..................... H02P 25/023 318/400.38 |
| 2007/0241715 | A1* | 10/2007 | Fujiwara et al. .............. 318/609 |
| 2008/0048603 | A1* | 2/2008 | Discenzo ..................... 318/561 |
| 2009/0106912 | A1* | 4/2009 | Filippa et al. ..................... 8/159 |
| 2012/0056569 | A1* | 3/2012 | Takamatsu ............. H02P 27/08 318/400.26 |

* cited by examiner

*Primary Examiner* — Bentsu Ro
*Assistant Examiner* — Zemenay Truneh
(74) *Attorney, Agent, or Firm* — Michael C. Stephens, Jr.

(57) ABSTRACT

Disclosed herein are sinusoidal modulation control methods and circuits for PMSM. In one embodiment, a method can include: detecting rotor position information of the PMSM to obtain a rotor position signal and a rotor rotating speed measured value; comparing the rotating speed measured value against a reference rotating speed value to generate an error signal, and generating a first regulating voltage signal based on the error signal using a PI regulator; receiving the rotor position signal and the first regulating voltage signal, and generating a full-wave U-shaped modulation wave by using the rotor position signal as a time reference; generating a second U-shaped modulation wave by multiplying the full-wave U-shaped modulation wave with the first regulating voltage signal; comparing the second U-shaped modulation wave against a triangular wave to generate a PWM control signal that controls a switch of an inverter to regulate a current of the PMSM.

7 Claims, 4 Drawing Sheets

US 9,317,019 B2

SINUSOIDAL MODULATION CONTROL METHODS AND CIRCUITS FOR PERMANENT MAGNET SYNCHRONOUS MOTORS

RELATED APPLICATIONS

This application claims the benefit of Chinese Patent Application No. 201210072854.1, filed on Mar. 19, 2012, which is incorporated herein by reference in its entirety.

FIELD OF THE INVENTION

The present invention relates to motor control techniques, and more specifically to sinusoidal modulation control methods and circuits for permanent magnet synchronous motors (PMSMs).

BACKGROUND

Permanent magnet motors can generally be divided into permanent magnet synchronous motors (PMSMs) and brushless DC motors (BLDCMs) according to air-gap magnetomotive force (MMF) and operating current waveforms. PMSM type motors have attracted increasing attention and usage due to its relatively high control precision, high torque density, good torque stability, and low noise. During the control procedure of permanent magnet synchronous motors, a driving torque for motors produced by a sinusoidal control current can be substantially smooth, so as to improve the torque control performance of motors and to significantly decrease running and starting noise. Therefore, the operating or "stator" current may be required to be sinusoidal current during operation of permanent magnet synchronous motors.

SUMMARY

In one embodiment, a method of control for a permanent magnet synchronous motor (PMSM) can include: (i) detecting rotor position information of the PMSM to obtain a rotor position signal and a rotor rotating speed measured value; (ii) comparing the rotating speed measured value against a reference rotating speed value to generate an error signal, and generating a first regulating voltage signal based on the error signal using a proportion integral (PI) regulator; receiving the rotor position signal and the first regulating voltage signal, and generating a full-wave U-shaped modulation wave by using the rotor position signal as a time reference; (iii) generating a second U-shaped modulation wave by multiplying the full-wave U-shaped modulation wave with the first regulating voltage signal; (iv) comparing the second U-shaped modulation wave against a triangular wave to generate a pulse-width modulation (PWM) control signal; and (v) controlling a switch of an inverter with the PWM control signal to regulate a current of the permanent magnet synchronous motor.

In one embodiment, a sinusoidal modulation control circuit for a permanent magnet synchronous motor, can include: (i) a position and speed sensor configured to detect a rotor position information of the permanent magnet synchronous motor to obtain a rotor position signal, and to generate a rotor rotating speed measured value based on the rotor position signal; (ii) a voltage regulating circuit configured to compare the rotating speed measured value against a reference rotating speed value to generate an error signal, and to generate a first regulating voltage signal based on the error signal through a PI regulator; and (iii) a PWM control circuit configured to receive the rotor position signal, the first regulating voltage signal, and a triangular wave, and to generate a PWM control signal, where the PWM control signal is configured to control a switch of an inverter to regulate a current of the permanent magnet synchronous motor.

Embodiments of the present invention can advantageously provide several advantages over conventional approaches. For example, a full-wave U-shaped modulation wave can be generated based on a rotor position signal of the PMSM, and a PWM control signal can be generated by comparing the U-shaped modulation wave and a triangular wave to control a switch of an inverter. In this way, the operating current of the PMSM can be a sine wave current. Control methods of particular embodiments may also realize rotating speed closed-loop control for the PMSM. Further, control schemes of particular embodiments may be simplified, and with improved operational results. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
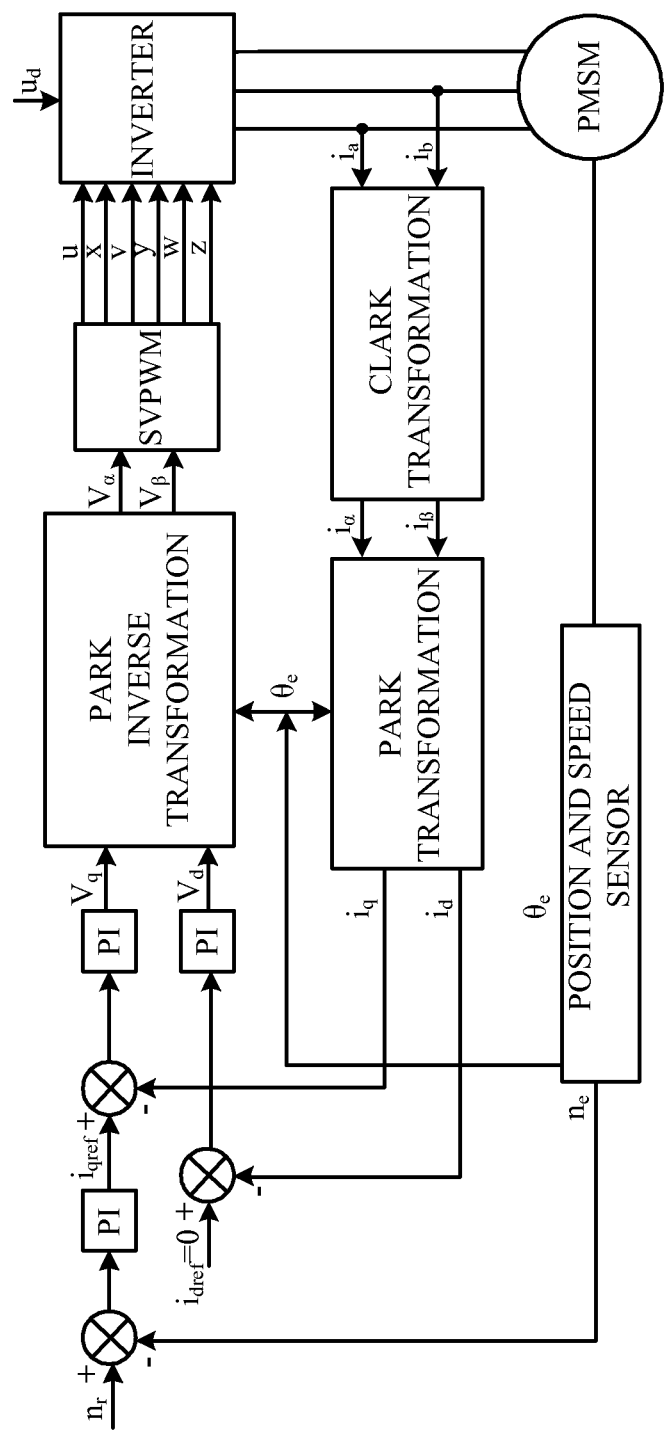
FIG. 1 is a block diagram of an example permanent magnet synchronous motor based on vector control.

A sine wave of a permanent magnet synchronous motor (PMSM) can be controlled by vector control method, as shown in the example of FIG. 1. In vector control, the amplitude and spatial location (e.g., frequency and phase) of the "stator" or operating current. In this example, the detected phase current $i_a$ and $i_b$ in a three-phase stator fixed coordinates system can be transformed to $i_\alpha$ and $i_\beta$ in a two-phase stator fixed coordinates system through "Clark" transformation. Together with rotor position angle $\theta_e$, $i_\alpha$ and $i_\beta$, in a two-phase stator fixed coordinates system can be transformed to $i_d$ and $i_q$ in a two-phase rotor rotating coordinates system through "Park" transformation.

Rotor speed $n_e$ detected by a rotor position and speed sensor can be compared against reference rotating speed $n_r$, and cross-axis reference current $i_{qref}$ can be generated through a proportional-integral (PI) regulator. Cross-axis and direct axis reference currents $i_{qref}$ and $i_{dref}$ can be respectively compared against corresponding feedback cross-axis and direct axis currents $i_q$ and $i_d$. For example, if direct axis reference current $i_{dref}$ is zero, voltages $V_q$ and $V_d$ can be obtained through PI regulators. Voltages $V_q$ and $V_d$ can be transformed to corresponding voltages $V_\alpha$ and $V_\beta$ in a two-phase static coordinates system through Park inverse transformation together with rotor position angle $\theta_e$. Voltages $V_\alpha$ and $V_\beta$ can be modulated to six switch signals by a space vector pulse-width modulation (SVPWM) circuit to control a switch in an inverter.

The vector control method as discussed above can break stator currents into independent direct axis current $i_d$ and cross-axis current $i_q$. Also, two currents can be respectively regulated to achieve good decoupling performance. Thus, the stator currents can be controlled as one or more sine waves to achieve high precision torque control. However, disadvantages of such vector control include increased complexity with an associated relatively high product cost due to the relatively complicated coordinate transformation to realize vector control. Also, because vector control may be largely dependent on the motor parameters, and not fully decoupled, possibly affecting control results.

Particular embodiments involve control methods and circuits for a permanent magnet synchronous motor (PMSM). Rotor position signals can be obtained by detecting rotor position information, and generating a full-wave U-shaped modulation wave by using rotor position signals as time references. The U-shaped modulation wave can be compared against a triangular wave to generate a pulse-width modulation (PWM) control signal. The PWM control signal can be used to control a switch of an inverter. In this way, the sine wave current of the permanent magnet synchronous motor can be controlled. This approach may be relatively simple as compared to conventional approaches because there may be no need to detect the stator current or to transform the vector coordinates. Also, relatively expensive rotor position detector devices, such as an optical encoder, may not be needed, thus reducing production costs. In addition, the modulation wave can be a symmetrical U-shaped modulation wave to lower the amplitude of the modulation wave, and to improve DC power supply availability.

In one embodiment, a sinusoidal modulation control circuit for a permanent magnet synchronous motor, can include: (i) a position and speed sensor configured to detect a rotor position information of the permanent magnet synchronous motor to obtain a rotor position signal, and to generate a rotor rotating speed measured value based on the rotor position signal; (ii) a voltage regulating circuit configured to compare the rotating speed measured value against a reference rotating speed value to generate an error signal, and to generate a first regulating voltage signal based on the error signal through a proportion integral (PI) regulator; and (iii) a pulse-width modulation (PWM) control circuit configured to receive the rotor position signal, the first regulating voltage signal, and a triangular wave, and to generate a PWM control signal, where the PWM control signal is configured to control a switch of an inverter to regulate a current of the permanent magnet synchronous motor.

Figure 2:
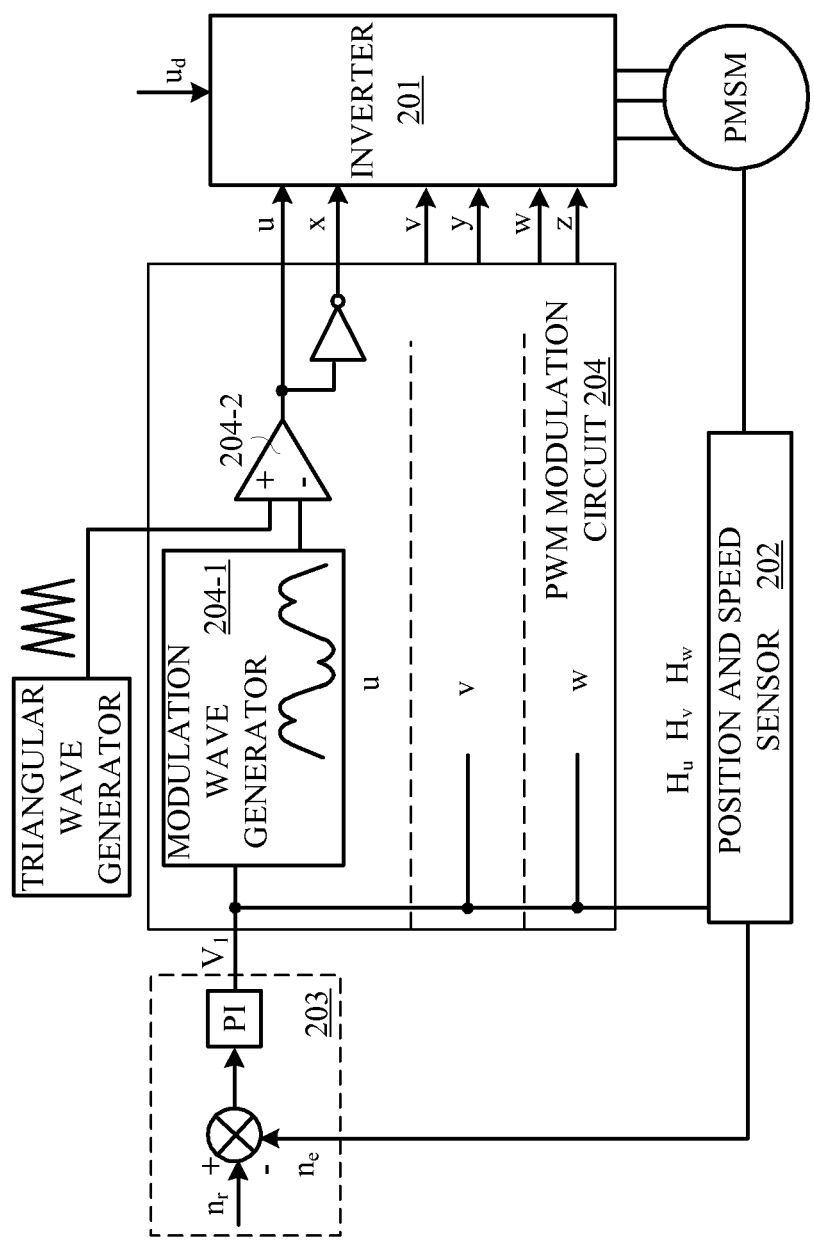
FIG. 2 is a block diagram of an example sinusoidal modulation control circuit for a permanent magnet synchronous motor in accordance with embodiments of the present invention.

Referring now to FIG. 2, shown is a block diagram of an example sinusoidal modulation control circuit for a permanent magnet synchronous motor, in accordance with embodiments of the present invention. The control circuit can include inverter 201, position and speed sensor 202, voltage regulator 203, and PWM modulation circuit 204. PWM modulation circuit 204 can include modulation wave generator 204-1 and comparison circuit 204-2. In this example, the stator winding in the permanent magnet synchronous motor can be configured as a three-phase winding. Of course, particular embodiments can also accommodate other numbers of winding phases as well.

Frequency and current commutating time of the power supply for inverter 201 can depend on the rotor's position information. Thus, rotor position information should be precisely detected. Here, position and speed sensor 202 can be used to detect rotor position information of the permanent magnet synchronous motor to obtain a rotor position signal and a rotor rotating speed measured value. In this example, position and speed sensor 202 can include three Hall effect sensors. The Hall effect sensors can detect the rotor position information and generate three-phase Hall signals through a decoding process, where the Hall signals include square-wave signals.

The three-phase Hall signals can be configured as the rotor position signals. Thus, the rotor position signals may not only be three-phase position signals, but also can be square signals denoted by $H_u$, $H_v$ and $H_w$. In addition, the three-phase Hall signals can be converted to rotating speed measured value $n_e$. This driving method with sensors of particular embodiments is relatively simple and convenient, and can be utilised in a wide variety of products, such as electric bicycles and variable frequency washing machines.

People skilled in the art will recognize that position and speed sensor 202 can take various forms of circuitry in certain implementations. For example, an alternative implementation can include position-sensorless detectors. In one case, a zero-crossing detector can be used to detect the zero-crossing point of stator winding back electromotive force (EMF) of the permanent magnet synchronous motor to obtain a back-EMF zero-crossing signal. Because back-EMF of the stator winding usually alternates from positive to negative, when the back-EMF of one winding crosses zero, the direct axis of the rotor may be substantially coincident with the axis of the corresponding winding. Therefore, as long as the zero-crossing point of the back-EMF of each phase is detected, the rotor position information can also be obtained.

The back-EMF zero-crossing signals obtained by detecting the back-EMF zero-crossing points can also be three-phase square-wave signals that may be substantially equivalent to the Hall signals discussed above. Thus, the back-EMF zero-crossing signals can be configured as the rotor position signals. In addition, the back-EMF zero-crossing signal can be converted to obtain the rotating speed measured value. Such position-sensorless applications can benefit from increased reliability due to not being as affected by the external environment (e.g., temperature, etc.).

Rotating speed measured value $n_e$ output by position and speed sensor 202 can be sent to voltage regulator 203. For example, voltage regulator 203 can include an error amplifier and a PI regulator. The error amplifier can be used to compare rotating speed measured value $n_e$ against reference rotating speed value $n_r$ to generate an error signal. The error signal can be used to generate first regulating voltage signal $V_1$ after being regulated by the PI regulator.

PWM modulation circuit 204 can include, e.g., three phase modulation circuits corresponding to u-, v-, and w-phases.

The modulation circuit of each phase can include modulation wave generator 204-1 and comparison circuit 204-2. Modulation wave generator 204-1 can be used to receive rotor position signals $H_u$, $H_v$ and $H_w$, and to generate a full-wave U-shaped modulation wave by setting the rotor position signals as time references.

Figure 3:
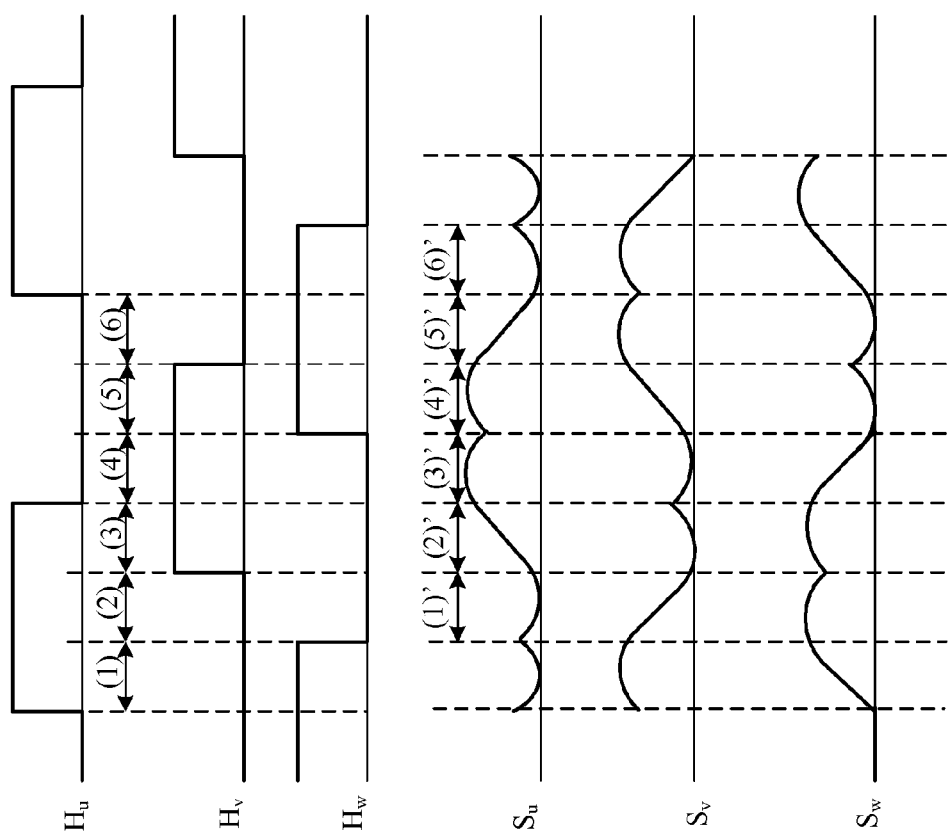
FIG. 3 is a waveform diagram showing an example operation of the modulation wave generator of the control circuit shown in FIG. 2.

The following will describe an example operating procedure of generating the U-shaped modulation wave in conjunction with the waveforms of FIG. 3. In the u-phase Hall signal example, the Hall signal can be divided into, e.g., six time periods [labeled (1)-(6) in FIG. 3] based on the Hall state. When the Hall signal (rotor position signal) is in period (1), the time width of period (1) can be recorded and taken as the time width of the corresponding U-shaped modulation wave [marked as (1)']. When in period (1)', this portion of the U-shaped modulation wave can be generated.

In particular embodiments, the U-shaped modulation wave can be generated via an analog approach. For example, the U-shaped modulation wave can be generated by superposing a fundamental wave and a third harmonic wave, where the waveform can be seen in period (1)' of FIG. 3. Similarly, the time width of periods (2), (3), (4), (5) and (6) of the Hall signal can be configured as corresponding time width of the U-shaped modulation wave's periods (2)', (3)', (4)', (5)' and (6)' to generate corresponding portions of the U-shaped modulation wave in each time period.

The starting and ending points of the wave in each time period can take the rising or falling edge of the Hall signal as a reference. For example, the starting point of the wave in period (1)' can be located at the falling edge of the w-phase Hall signal, and the end point can locate at the rising edge of the v-phase Hall signal. Each portion of the U-shaped modulation wave corresponding to the six time periods as shown can be connected together to form the full-wave U-shaped modulation wave. In this way, u-phase full-wave U-shaped modulation wave can be generated based on the u-phase Hall signal. In addition, v-phase and w-phase full-wave U-shaped modulation waves can be generated in the same fashion.

It should be noted that the phase of the U-shaped modulation wave of each phase may be different from each other when the phases of the three Hall signals are different. For example, when Hall signal $H_u$ is about 120° ahead of Hall signal $H_v$, and Hall signal $H_v$ is about 120° ahead of Hall signal $H_w$, the corresponding U-shaped modulation wave $S_u$ may be about 120° ahead of U-shaped modulation wave $S_v$. Also, U-shaped modulation wave $S_v$ may be about 120° ahead of U-shaped modulation wave $S_w$, as shown in the example of FIG. 3.

Referring back to FIG. 2, modulation wave generator 204-1 can be used to multiply the full-wave U-shaped modulation wave and first regulating voltage signal $V_1$, and to generate a second U-shaped modulation wave. Here, the second U-shaped modulation wave can also be a full-wave U-shaped modulation wave. Comparison circuit 204-2 can compare the second U-shaped modulation wave (including u, v and w phases) against a triangular wave to generate a PWM control signal. For example, the PWM control signal can include six switch control signals denoted by u, x, v, y, w and z. The PWM control signal can be used to control the switch of inverter 201 to regulate the current of permanent magnet synchronous motor. In this way, sine wave current control of the permanent magnet synchronous motor can be achieved.

It should be noted that, while the block diagram of FIG. 2 only shows an example circuit structure of the u-phase, the circuit structures of the v- and w-phases may be substantially the same as the u-phase, where the triangular wave can be generated by an external triangular wave generator.

The PWM control signal can be controlled by the rotor position signals when the full-wave U-shaped modulation wave is combined with the rotor position signals of the permanent magnet synchronous motor. Thus, the current commutating time of the inverter can be determined by the rotor position signal to make sure that the motor can operate steadily and continuously. Also, the full-wave U-shaped modulation wave can be used to control the supply current of the inverter such that the three-phase stator current includes a sine wave to realize sine current control. Also, first regulating voltage signal $V_1$ can be used to regulate the rotating speed to satisfy different requirements or applications. Certain embodiments may be particularly suitable for applications that may not require a high precise rotating speed, and those with relatively low perturbations.

In one embodiment, a method of control for a permanent magnet synchronous motor (PMSM) can include: (i) detecting rotor position information of the PMSM to obtain a rotor position signal and a rotor rotating speed measured value; (ii) comparing the rotating speed measured value against a reference rotating speed value to generate an error signal, and generating a first regulating voltage signal based on the error signal using a proportion integral (PI) regulator; receiving the rotor position signal and the first regulating voltage signal, and generating a full-wave U-shaped modulation wave by using the rotor position signal as a time reference; (iii) generating a second U-shaped modulation wave by multiplying the full-wave U-shaped modulation wave with the first regulating voltage signal; (iv) comparing the second U-shaped modulation wave against a triangular wave to generate a pulse-width modulation (PWM) control signal; and (v) controlling a switch of an inverter with the PWM control signal to regulate a current of the permanent magnet synchronous motor.

Figure 4:
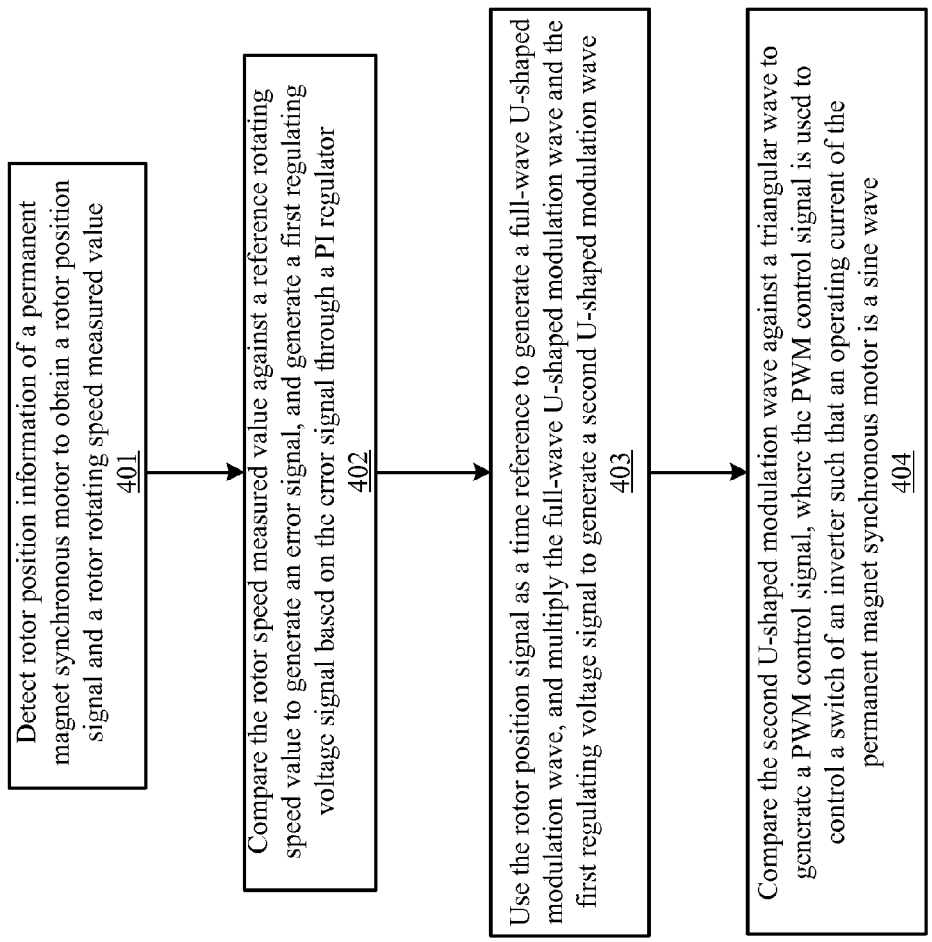
FIG. 4 is a flow diagram of an example sinusoidal modulation control method for a permanent magnet synchronous motor in accordance with embodiments of the present invention.

Referring now to FIG. 4, shown is a flow diagram of an example sinusoidal modulation control method for a permanent magnet synchronous motor in accordance with embodiments of the present invention. At 401, the rotor position information of the permanent magnet synchronous motor can be detected to obtain a rotor position signal, and to generate a rotor rotating speed measured value based on the rotor position signal. At 402, the rotating speed measured value can be compared against a reference rotating speed value to generate an error signal. Also, a first regulating voltage signal can be generated based on the error signal through a PI regulator.

At 403, the rotor position signal and the first regulating voltage signal can be used to generate a full-wave U-shaped modulation wave by taking the rotor position signal as a time reference. Also, a second U-shaped modulation wave can be generated by multiplying the full-wave U-shaped modulation wave with the first regulating voltage signal. At 404, the second U-shaped modulation wave can be compared against a triangular wave to generate a PWM control signal. The PWM control signal can be used to control a switch of an inverter so as to regulate the current of the permanent magnet synchronous motor, and to realize sine wave current control for the permanent magnet synchronous motor.

In this example, the stator winding of the permanent magnet synchronous motor can be configured as a three-phase winding, so the rotor position signal can be a three-phase square-wave signal corresponding to the three-phase stator winding. For example, 403 can also include using the rotor position signal as a time reference to divide the rotor position signal into several time periods, and generating a portion of U-shaped modulation wave in each time period to form a full-wave U-shaped modulation wave by connecting the portions of the U-shaped modulation wave together.

Particular embodiments also set forth a method to achieve a maximum output torque by regulating the phase angle between the rotor position and the stator current. For example, the phase angle can be regulated between the stator magnetomotive force and rotor magnetomotive force, to obtain the torque generated of each ampere stator current. In one example, the phase angle between the rotor position and the stator current can be regulated by an external enable signal. The external enable signal can shift the full-wave U-shaped modulation wave to the left or right of the rotor position signal, so as to change the angle between the stator magnetomotive force and rotor magnetomotive force. When the maximum torque can be guaranteed, the stator current can be set as a minimum to reduce the motor copper losses and to improve power availability.

In the example sinusoidal modulation control method described above, the rotor position signal can be taken as a time reference to generate a full-wave U-shaped modulation wave. The U-shaped modulation wave can be used to generate a PWM control signal to make the stator current of the permanent magnet synchronous motor include sine wave current. Particular embodiments can also regulate the rotor rotating speed based on the first regulating voltage signal that represents rotating speed feedback information to accommodate requirements for regulating rotating speed under different circumstances.

From the above description of the embodiments of the present invention, example sinusoidal modulation control circuits and methods for a permanent magnet synchronous motor can generate full-wave U-shaped modulation waves by taking the rotor position signals as the time references to control the output of the inverter. In this way, the stator current of the permanent magnet synchronous motor can be configured as a sine wave current. Also, by regulating the output torque, the stator current can be minimized when the output torque is maximized to reduce motor power losses, and to improve availability. The control scheme of particular embodiments may not need to detect the stator current, or utilize relatively complicated coordinate transformation calculations. As such, the circuit product cost can be relatively low and application scope can be broader, as compared to conventional approaches. Also, the modulation wave in particular embodiments can be a substantially symmetrical U-shaped modulation wave with relatively low amplitude to improve availability of the DC power supply.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A sinusoidal modulation control method for a permanent magnet synchronous motor, the method comprising:
   a) detecting rotor position information of said permanent magnet synchronous motor to obtain a plurality of rotor position signals and a rotor rotating speed measured value, wherein said plurality of rotor position signals comprises three-phase Hall signals that correspond to three Hall effect sensors;
   b) comparing said rotating speed measured value against a reference rotating speed value to generate an error signal, and generating a first regulating voltage signal based on said error signal using a proportional-integral (PI) regulator;
   c) receiving said plurality of rotor position signals and said first regulating voltage signal, and generating a full-wave U-shaped modulation wave by using said plurality of rotor position signals as a plurality of time references;
   d) generating a second U-shaped modulation wave by multiplying said full-wave U— shaped modulation wave with said first regulating voltage signal;
   e) comparing said second U-shaped modulation wave against a triangular wave to generate a pulse-width modulation (PWM) control signal;
   f) controlling a switch of an inverter with said PWM control signal to regulate a current of said permanent magnet synchronous motor; and
   g) regulating a rotor position angle by an external enable signal by using said external enable signal to shift said full-wave U-shaped modulation wave left or right of one of said plurality of rotor position signals to change said rotor position angle between a stator magneto-motive force and a rotor magneto-motive force to maximize torque generated at every ampere stator current.

2. The method of claim 1, wherein said generating said full-wave U-shaped modulation wave comprises:
   a) dividing said plurality of rotor position signals into a plurality of time periods; and
   b) generating a portion of said full-wave U-shaped modulation wave in each of said plurality of time periods to form said full-wave U-shaped modulation wave.

3. The method of claim 2, wherein said plurality of time periods comprises six time periods.

4. The method of claim 1, wherein said detecting said rotor position information comprises using a position-sensorless detector to obtain each of said plurality of rotor position signals.

5. A sinusoidal modulation control circuit for a permanent magnet synchronous motor, wherein said control circuit comprises:
   a) a position and speed sensor configured to detect a rotor position information of said permanent magnet synchronous motor to obtain a plurality of rotor position signals, and to generate a rotor rotating speed measured value based on said plurality of rotor position signals, wherein said plurality of rotor position signals comprises three-phase Hall signals that correspond to three Hall effect sensors;
   b) a voltage regulating circuit configured to compare said rotating speed measured value against a reference rotating speed value to generate an error signal, and to generate a first regulating voltage signal based on said error signal through a proportional-integral (PI) regulator;
   c) a pulse-width modulation (PWM) control circuit configured to receive said plurality of rotor position signals, said first regulating voltage signal, and a triangular wave, and to generate a PWM control signal, wherein said PWM control signal is configured to control a switch of an inverter to regulate a current of said permanent magnet synchronous motor; and
   d) wherein a rotor position angle is configured to be regulated by an external enable signal configured to shift said full-wave U-shaped modulation wave left or right of one of said plurality of rotor position signals to change said rotor position angle between a stator magneto-motive force and a rotor magneto-motive force to maximize torque generated at every ampere stator current.

6. The control circuit of claim 5, wherein said PWM control circuit comprises:
   a) a modulation wave generator configured to receive said plurality of rotor position signals and said first regulating voltage signal, and to generate a full-wave U-shaped modulation wave by using said plurality of rotor position signals as a plurality of time references, wherein said full-wave U-shaped modulation wave is multiplied with said first regulating voltage signal to generate a second U-shaped modulation wave; and b) a comparison circuit configured to compare said second U-shaped modulation wave and a triangular wave to generate said PWM control signal.

7. The control circuit of claim 6, wherein said modulation wave generator is configured to:

a) divide said plurality of rotor position signals into a plurality of time periods; and b) generate a portion of said full-wave U-shaped modulation wave in each of said plurality of time periods to form said full-wave U-shaped modulation wave.

* * * * *